Patented July 8, 1930

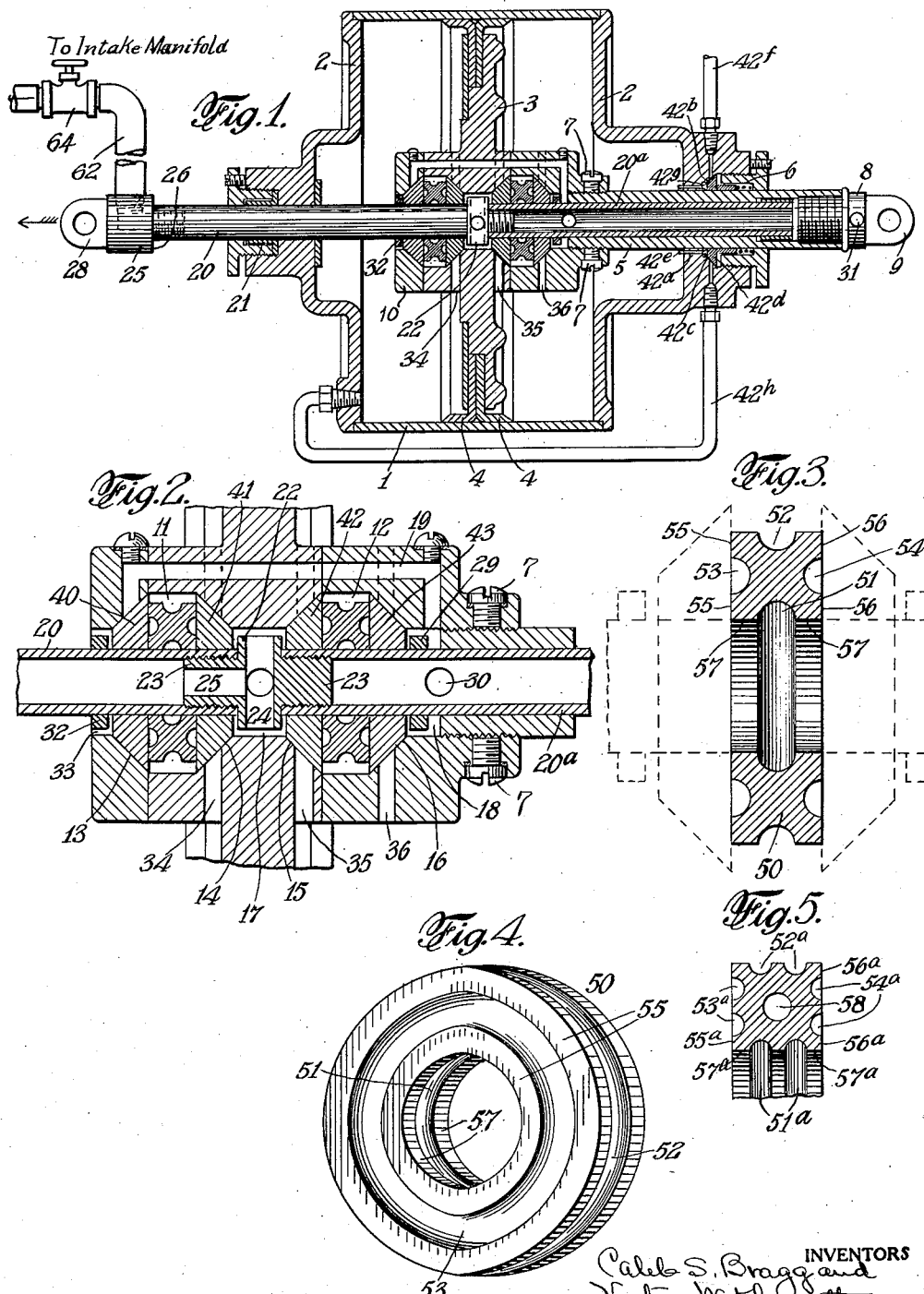

1,770,193

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POPPET-VALVE MECHANISM FOR POWER ACTUATORS AND THE LIKE

Application filed January 31, 1925, Serial No. 5,947. Renewed January 28, 1928.

Our invention consists in the novel features hereinafter described, reference being had to the accompanying drawing which shows one form or embodiment of the invention selected by us for purposes of illustration, and the said invention is fully disclosed in the following description and claims:—

In our former application for Letters Patent of the United States, filed Nov. 22, 1924, and given Serial No. 751,481, we have illustrated, described and claimed certain poppet valve mechanism, comprising a plurality of concentric valves provided with central apertures to receive an actuating part movable with respect thereto, and provided with means for engaging and opening certain of said valves when moved in either direction and provided with means for holding the valves normally seated and for sealing the apertures in said valves through which the actuating part movably extends.

Our present invention is an improvement in the valve mechanism covered by our former application above referred to and consists essentially of a new and improved combined retracting and sealing device for the valve or valves and in the combination thereof with the valves and their actuating mechanism as hereinafter more fully described and as particularly pointed out in the claims.

In the accompanying drawings we have shown our improved valve mechanism arranged in connection with and constituting the reversing valve mechanism of a power actuator of the kind shown and described in our former application above referred to and to which use it is well adapted, but it is to be understood that our invention may be embodied in valve mechanism for any other purpose for which it is or may become desirable or advantageous.

Referring to the accompanying drawing which shows one embodiment of our invention selected by us for the purpose of illustrating our invention, Fig. 1 is a sectional view of a power actuator provided with one form of poppet valve reversing mechanism, embodying our invention and especially arranged for use where the actuator is operated by vacuum working against atmospheric air.

Fig. 2 is an enlarged sectional view of the valve mechanism shown in Fig. 1.

Fig. 3 is an enlarged sectional view of a combined retracting and sealing device which we prefer to employ in connection with our valves, the position of two adjacent and oppositely disposed valves, and the actuating device therefor being indicated in dotted lines.

Fig. 4 is an enlarged detail perspective view of one of the combined retracting and sealing devices detached.

Fig. 5 is a section of a modification of the combined retracting and sealing device.

Referring to Figs. 1 and 2 of the accompanying drawing, which shows a valve mechanism particularly adapted for use with suction operating against air at atmospheric pressure, 1, represents the cylinder of our improved actuator closed at its opposite ends by heads, 2, which may be connected by bolts (not shown) in the usual manner. 3 represents the double acting piston, provided with oppositely disposed gaskets, 4—4. 5 represents a hollow piston rod, which extends through a stuffing box, 6, in one end of the cylinder, and is provided at its inner end with threaded portions screwed into the hub of the piston and held against accidental displacement by set screws, 7. The outer end of the piston rod is preferably provided with a hollow screw plug, 8, having at its outer end, an attaching lug, or lugs, 9, by means of which it may be attached to the part to be actuated.

The hub, 10, of the actuator piston is provided with two valve chambers, 11 and 12, respectively, each of which is provided with two oppositely disposed valve seats, preferably conical and concentric to the axis of the piston. Thus the valve chamber, 11, is shown as provided with the conical valve seats, 13, 14, and the valve chamber, 12, is shown as provided with conical valve seats, 15 and 16. The piston hub is provided between the valve chambers with an outlet or lower pressure chamber, indicated at 17, and communicating with each of the valve chambers, through the valve seats, 14 and 15 respectively, and a separate inlet or higher pressure chamber, 18, which likewise communicates with both of the valve chambers. The inlet or higher pressure chamber is conveniently arranged at one end of the piston, and in this instance, adjacent to the valve chamber, 12, with which it communicates through valve seat, 16, said chamber, 18, being also connected by a lateral passage, 19, with the valve seat, 13, of valve chamber, 11.

20 represents the valve actuating part consisting in this instance of a valve sleeve passing through a stuffing box, 21, in the cylinder head at the opposite end of the cylinder from the hollow piston rod, 5, and said sleeve also extends longitudinally through the piston hub, through the chambers 11, 17, 12 and 18, and into the hollow piston rod, 5, and is movable longitudinally with respect to the piston and piston rod, to effect the operation of the reversing valves as hereinafter described. In order to connect the chambers, 17 and 18, of the piston hub with the respective sources of higher and lower pressures for operating the actuator, we preferably form the valve sleeve in two parts, as 20 and 20ª, connected centrally so that the two sections of the sleeve do not communicate. As shown, the sleeve section, 20 and 20ª, are screwed upon plugs, 23, projecting oppositely from a collar 22 located in the outlet chamber, 17, thus uniting the sleeve sections, but preventing communication between them. The collar, 22, is provided with one or more lateral passages, 24, communicating with the interior of the sleeve section, 20, by means of a longitudinal passage, 25, in one of the plugs, 23, and also communicating with the outlet chamber, 17, which is of sufficiently greater diameter than the collar, 22, to provide an annular space within the chamber surrounding the collar. The outer end of the sleeve section, 20, is provided with a lateral outlet passage, 26, to the source of suction located in this instance in a hollow fitting, 25, screwed into or upon the sleeve section, 20, and closed at its outer end. This fitting is conveniently provided with a perforated ear or lug, 28, by which it may be connected to a suitable manually operated or operator operated part, as the usual brake lever of an automobile provided with a retracting spring, or a hand operated lever, or other suitable device, for effecting the longitudinal movements of the valve sleeve. The section, 20ª, of the valve sleeve is provided with a collar, 29, within the inlet chamber, 18, and with one or more lateral apertures, 30, communicating with the said chamber. The rear end of the valve sleeve section, 20ª, communicates with the interior of the hollow piston rod, 5, which is provided with a lateral inlet aperture, 31, in this instance provided in the terminal plug, 8, and communicating with the interior of the piston rod. The valve sleeve section, 20, is also provided with a collar or flange, 32, on the forward side of the piston and preferably located in, but not tightly fitting an aperture, 33, in the piston hub, of greater diameter than the valve stem and communicating with the valve seat, 13.

The outlet chamber, 17, is adapted to be connected with the cylinder on opposite sides of the piston. For this purpose the valve seat, 14, is provided with a port or ports, 34, opening into the cylinder on the forward side of the piston, while the valve seat, 15, is provided with similar ports, 35, opening into the cylinder in rear of the piston, these valve seats being on opposite sides of the outlet chamber, 17. In connection with the chamber, 18, we provide the valve seat, 16, with a passage, 36, communicating with the cylinder in rear of the piston, the chamber, 18, being connected with the cylinder forward of the piston by the passage, 19, to the valve seat, 13, which communicates with the aperture, 33.

In each of the valve chambers the valve sleeve section therein is provided with a pair of oppositely disposed valves, preferably conical, engaging the valve seats before described, said valves being located between two adjacent collars on the valve sleeve. These valves are not rigidly secured to the valve sleeve sections, but are mounted loosely thereon, permitting the actuating part or sleeve to move readily through the valves. These valves may be made of rubber or other suitable material, as leather, fibre, etc., having a certain degree of elasticity so that they will adapt themselves to their respective valve seats and make an air tight or gas tight connection therewith, or they may be made of suitable metal if preferred. We have found that conical valves of molded rubber are especially well adapted for this purpose but we do not desire to be limited to this material nor to this particular form.

In the present instance we have shown the valve stem section, 20, provided with the oppositely arranged conical valves, 40 and 41, engaging valve seats, 13 and 14 respectively, within valve chamber, 11, and similar valves, 42 and 43, are arranged on sleeve section, 20ª.

It will be observed that the valves, 40, 41, 42 and 43, are arranged in two pairs upon the same actuating device, to wit, the sleeve, 20—20ª, which is capable of moving freely through the valves, and is provided with the valve actuating collars, 32, 22 and 29, so arranged that when the sleeve is moved longitudinally in either direction, one valve of each pair is opened, to connect the inlet chamber with the cylinder on one side of the piston and the outlet chamber with the cylinder on the opposite side of the chamber. We provide each valve with yielding or cushioning means performing the function of a seating or retracting spring, and with sealing means for effecting an air or gas tight joint between the actuating part or sleeve, and the valve. We prefer to locate said means between each pair of valves so that we may obtain the further function, to wit, that said means will be compressed whenever the valve actuating sleeve is moved in either direction to open one valve of each pair, and thereby compress said intermediate spring and cushioning means, and increase its effective pressure on the other valve of the pair to even more firmly hold it closed and prevent leaks, and to return the valve sleeve to neutral position when the actuating valve is released. In this instance we prefer to employ the combined seating and retracting and sealing device illustrated in detail in Figs. 3 and 4, and indicated at 50. This device is preferably made of elastic rubber or other suitable elastic material of annular form, the interior diameter, or in other words, the diameter of the central aperture therethrough, being such that the device will snugly engage the portion of the valve actuating device or sleeve extending therethrough, the lateral faces of the device being adapted to engage the opposite faces of the valves and being preferably in two parallel planes as shown, and being held under compression between the opposite faces or valves. We prefer to provide the inner cylindrical face of the device with an annular groove, indicated at 51, and the exterior cylindrical face or periphery with an annular groove, 52, both grooves being centrally disposed as shown, and in line with each other transversely of the axis of the annular body or ring, 50. We also prefer to provide the lateral faces with the annular grooves 53 and 54 respectively arranged centrally between the inner and outer cylindrical faces of the ring, as clearly indicated in Figs. 3 and 4. These grooves serve several useful functions, among which may be mentioned that they increase the resiliency and compressibility of the ring without materially weakening its retractive power, and further they present two annular separated faces, 55—55, 56—56, to frictionally engage the faces of the valves and two annular faces, 57—57, to frictionally engage the cylindrical exterior surface of the valve actuating part or sleeve (20 or 20ª), so that a very effective sealing action between the device, 50, the engaged faces of the valves, and the engaged surface of the valve actuating part, is effected.

It will be understood that the construction of the ring or cushion, 50, which we term a combined seating, retracting and sealing device, may be compressed laterally to permit either of the valves to be opened by the longitudinal movement of the valve actuating part or sleeve, and will act as a retracting spring to return the valve to and hold it in normal position, and that it will permit the longitudinal movement of the actuating part or sleeve through the ring or cushion, 50, while at all times maintaining a sealing contact between the ring, the surface of the actuating part within the same, and the face or faces of the valve or valves in engagement within, and maintaining an air tight joint between the cushion, or ring, 50, and said valve or valves, and said actuating part and effectually sealing at all times the apertures in said valves through which the actuating part passes. As the ring or cushion, 50, has two annular faces in engagement with each valve, and in engagement with the actuating part, any air which might possibly leak past one of said annular surfaces would be trapped by the other and prevented from going further.

While we have shown the cushioning and sealing rings 50, as located between two oppositely disposed valves, it is perfectly obvious that they would act just as effectively in connection with a single valve by having them engage a plane stationary surface on the side opposite the valve. It will also be understood that where they are employed as herein shown and described between two oppositely disposed valves it must follow that whenever one valve is opened, and the seating, cushioning and sealing ring, 50 between them is thereby compressed, it will increase the yielding pressure of the seating, cushioning and sealing ring against the other valve, and likewise upon the surface of the valve actuating part, thereby tending to more firmly hold the said other valve in closed position, and to more effectively, if anything, seal the aperture therein through which the actuating part passes.

Referring now to Figs. 1 and 2, the operation of the actuator, and the valve mechanism thereof is as follows, it being understood that the passage, 26, is connected with means for producing suction or rarification, as for example, the intake manifold of an internal combustion engine, in the manner set forth in our prior application for Letters Patent of the United States, filed Jan. 5, 1925, and given Serial Number 504, the actuating part or valve sleeve being connected to a foot pedal, hand lever, or other operator operated part (not shown) and the piston rod, 5, being connected to the part to be actuated.

We prefer to provide means for maintaining a partial vacuum within the cylinder of the actuator on both sides of the piston when the piston is in retracted or "off" position. This can be accomplished in a number of ways as illustrated and described in our former application referred to in the preceding paragraph, and which form no part of our present invention. We have, however, illustrated one arrangement for this purpose in order that the operation of the actuator may be more readily understood. In this instance the head 2 of the cylinder at the right in Figure 1 against which the hub of the piston impinges when the parts are in the retracted or "off" position is provided with a passage or passages 42$^a$ communicating with a recess 42$^b$ in which is located a valve seat 42$^c$ engaged by a movable auxiliary valve 42$^d$ which valve seat is connected by a pipe 42$^h$ with the cylinder on the forward side of the piston to the left in Fig. 1. The valve seat 42$^c$ is also connected by a pipe 42$^f$ with the source of suction, as by connecting it with the suction pipe indicated at 62, and leading to the aperture 26 of the valve sleeve, section 20. The valve 42$^d$ when in closed position upon its seat 42$^c$ closes communication between the vacuum tube 42$^f$, and the interior of the cylinder on both sides of the piston. The valve is operated by a ring 42$^g$ provided with one or more projections 42$^e$ extending into the cylinder far enough to be struck by the piston hub when the piston returns to its normal position, so as to insure the opening of the valve 42$^d$ thus placing the suction pipe 42$^f$ in communication with the interior of the cylinder on both sides of the piston.

It will be understood that when the parts are in neutral position, all four of the poppet volves 40, 41, 42 and 43 are seated, and the piston is in a balanced or neutral condition, and held from movement. When the piston is in the normal or "off" position, and valves held neutral as afterwards described, hub of the piston engages the pins 42$^e$ and holds the valve 42$^d$ in open position, so that there is a partial vacuum in the cylinder on both sides of the piston. If now the operator operated part, to wit, the valve sleeve is moved forwardly in the direction of the arrow in Figure 1, the valve 43 will be opened by the collar 29, and the valve 41 will be opened by the central collar 22, thereby compressing both of the retracting and sealing devices or rings 50 and pressing the valves 42 and 40 more firmly upon their seats. Air will immediately flow into the cylinder through the aperture 31, sleeve section 20$^a$, chamber 18, and ports 36 and cause the piston to move forward in the direction of the arrow, Figure 1, and as indicated therein, releasing the pins 42$^e$ and permitting the auxiliary valve 42$^d$ to close, but no appreciable amount of air will be drawn into the suction means, as the intake manifold, through the pipe 62 as the portion of the cylinder forward of the piston is already exhausted. There is therefore no effect produced on the explosive charges of the engine, in case the intake manifold is relied upon as the source of suction, when the actuator piston is moved forward in the direction of the arrow as for example, to apply the brake mechanism connected with the piston in any usual or desired manner.

When the movement of the valve sleeve is reversed, as by the release of the foot lever or other operator operated device, which is connected thereto, the valves 40 and 42 will be opened, thereby compressing both of the retracting and sealing devices or rings, 50 and pressing the valves 41 and 43 firmly on their seats. This places the suction chamber, 17, in connection with the portion of the cylinder in rear of the piston (to the right in the drawing), and simultaneously places the portion of the cylinder forward of the piston (to the left in the drawing), in communication with the atmosphere. The air will be exhausted from the rear portion of the cylinder through the suction passages, and the air admitted to the forward side of the piston will move the piston rearwardly. The air exhausted from the cylinder can be delivered gradually to the intake manifold by properly regulating a restricting valve 64, in the pipe 62, so that the operation of the engine shall not be interfered with, and the eduction of the air from the cylinder on both sides of the piston may be retarded, as much as desired, as the first movement of the piston rearwardly assisted by the braking load, will relieve the pressure of the brakes, and it is not important that the piston move rearwardly as quickly as it moves forwardly to apply the brakes.

When the piston is restored to normal position, the piston hub will engage the adjacent end of the cylinder, and the valve actuating sleeve will be arrested by the part 26, engaging the adjustable follower with which the stuffing box 21 is provided. The hub of the piston will engage the projections 42$^e$ of the ring, 42$^g$, and open the valve, 42$^d$, establishing communication between the vacuum tube, or suction tube, 42$^f$, and the interior of the cylinder on both sides of the piston, and withdrawing the air admitted to the cylinder to move the piston back to normal position.

It will be understood that, as before stated, when the parts are assembled, the yielding or cushioning device, 50, (or 50$^a$) is compressed to the desired extent, and is always held under compression, so that the said device normally maintains the valve or valves which it engages seated when the valve actuating part or sleeve is in normal or off position, and restores it (or them) to seated position when released by the valve actuating part. Obviously when the actuating part or sleeve is moved in a direction to open the valve, the yielding or cushioning device is further compressed, and where the device is used between a pair of oppositely disposed valves, this increased compression will be applied to the other valve of the pair, to hold it even more firmly seated.

While we prefer to construct the combined retracting and sealing device as previously described, having a single central groove in each of the annular faces and in each of the lateral faces, which construction we have found to give the best results both in its sealing qualities and in imparting the desired resiliency to the device. We do not desire to be limited to this precise construction, as variations may be made therein without departing from the invention. For example, in Fig. 5, we have shown a slightly modified form of the device in which corresponding parts are indicated by the same numerals as in the other figures, with the addition of the letter "a". In this figure, each of the lateral faces of each of the annular faces is provided with a plurality of grooves, 51ª, 52ª, 53ª, 54ª, in this instance two on each face, and the central portion between the lateral faces and annular faces is provided with an annular tubular recess, indicated at 58, containing air which will add to the resiliency of the device. This central recess may, however, be dispensed with in some instances.

What we claim and desire to secure by Letters Patent is:—

1. The combination with a valve seat, a poppet valve for engaging said seat provided with an axial aperture, and a longitudinally movable actuating part extending through said aperture and provided with a valve engaging part for moving the valve with respect to its seat, of a combined retracting and sealing device consisting of an annular body of elastic compressible material, surrounding the said actuating part and having an inner cylindrical face frictionally engaging said actuating part and a lateral face for engaging the valve and holding it yieldingly upon its seat, at least one of said faces being provided with an annular groove therein, and means for engaging the opposite lateral face of said annular body and holding it under compression.

2. The combination with a valve seat, a poppet valve for engaging said seat provided with an axial aperture, and a longitudinally movable actuating part extending through said aperture and provided with a valve engaging part for moving the valve with respect to its seat, of a combined retracting and sealing device consisting of an annular body of elastic compressible material, surrounding the said actuating part and having an inner cylindrical face frictionally engaging said actuating part and a lateral face for engaging the valve and holding it yieldingly upon its seat, and means for engaging the opposite lateral face and holding said annular body under compression, each of said lateral faces being provided with an annular groove.

3. The combination with a valve seat, a poppet valve for engaging said seat provided with an axial aperture, and a longitudinally movable actuating part extending through said aperture and provided with a valve engaging part for moving the valve with respect to its seat, of a combined retracting and sealing device consisting of an annular body of elastic compressible material, surrounding the said actuating part and having an inner cylindrical face frictionally engaging said actuating part and a lateral face for engaging the valve and holding it yieldingly upon its seat, and means for engaging the opposite lateral face and holding said annular body under compression, each of said lateral faces and said inner cylindrical face being provided with an annular groove therein.

4. The combination with a valve seat, a poppet valve for engaging said seat provided with an axial aperture, and a longitudinally movable actuating part extending through said aperture and provided with a valve engaging part for moving the valve with respect to its seat of a combined retracting and sealing device consisting of an annular body of elastic compressible material, surrounding the said actuating part and having an inner cylindrical face frictionally engaging said actuating part and a lateral face for engaging the valve and holding it yieldingly upon its seat, and means for engaging the opposite lateral face and holding said annular body under compression, each of said faces and the exterior cylindrical face of said annular body being provided with an annular groove, and providing separated annular face portions on opposite sides of said groove.

5. The combination with a pair of oppositely disposed coaxial valve seats, of oppositely disposed valves engaging said seats provided with coaxial apertures, and a longitudinally movable actuating part extending through and movable through said apertures and provided with valve engaging portions for unseating one of said valves when moved longitudinally in either direction, and a combined retracting and sealing device consisting of an annular body of elastic material surrounding and engaging said actuating part and held under compression between said valves, and having its lateral valve engaging faces, and its inner cylindrical face each provided with a centrally located annular groove.

6. The combination with a pair of oppositely disposed coaxial valve seats, of oppositely disposed valves engaging said seats provided with coaxial apertures, and a longitudinally movable actuating part extending through and movable through said apertures and provided with valve engaging portions for unseating one of said valves when moved longitudinally in either direction, and a combined retracting and sealing device consisting of an annular body of elastic material surrounding and engaging said actuating part and held under compression between said valves, and having its lateral valve engaging faces, and its inner and outer cylindrical faces each provided with a centrally located annular groove.

7. The combination with a valve seat, a poppet valve for engaging said seat provided with an axial aperture, and a longitudinally movable actuating part movable through said aperture and provided with a rigid valve engaging part for moving the valve with respect to its seat, of a combined retracting and sealing device consisting of an annular body of elastic compressible material, surrounding the said actuating part and having an inner cylindrical face frictionally engaging said actuating part and a lateral face for engaging the valve and holding it yieldingly upon its seat, and means for engaging the opposite face of the body to hold it under compression.

8. The combination with a valve seat, a poppet valve for engaging said seat provided with an axial aperture, and a longitudinally movable actuating part movable through said aperture and provided with a rigid valve engaging part for moving the valve with respect to its seat, of a combined retracting and sealing device consisting of an annular body of elastic compressible material, surrounding the said actuating part and having an inner cylindrical face frictionally engaging said actuating part and a lateral face for engaging the valve and holding it yieldingly upon its seat, means for engaging the opposite face of the body to hold it under compression, and means provided in at least one face of the body for increasing the resiliency of said body.

9. The combination with a valve seat and a poppet valve for engaging said seat and provided with an aperture, of a combined retracting and sealing device comprising an annular body of compressible material having a lateral face for engaging said valve and tending to hold the same yielding against its seat, an actuating member passing through said valve and body and movable with and with respect to the valve and body and having means to operate said valve, said member having a friction fit with the valve and body, and means engaging the opposite face of the body to hold it under compression and in sealing engagement with the member and valve.

10. The combination with a valve seat and a valve engaging said seat provided with an axial aperture, a longitudinally movable actuating part extending through and movable through said aperture, and a valve engaging portion on said part for unseating said valve when said part is moved longitudinally, of a combined retracting and sealing device consisting of an annular body of elastic material surrounding and engaging said part and having one lateral valve engaging face and its inner cylindrical face each provided with an annular groove, and means acting on said sealing device for holding it under compression and in sealing engagement with said actuating part and said valve.

In testimony whereof we affix our signatures.

CALEB S. BRAGG.
VICTOR W. KLIESRATH.